April 21, 1931. E. C. BECHT 1,801,992
APPARATUS FOR MAKING CONFECTIONS
Filed Feb. 16, 1926 2 Sheets-Sheet 1
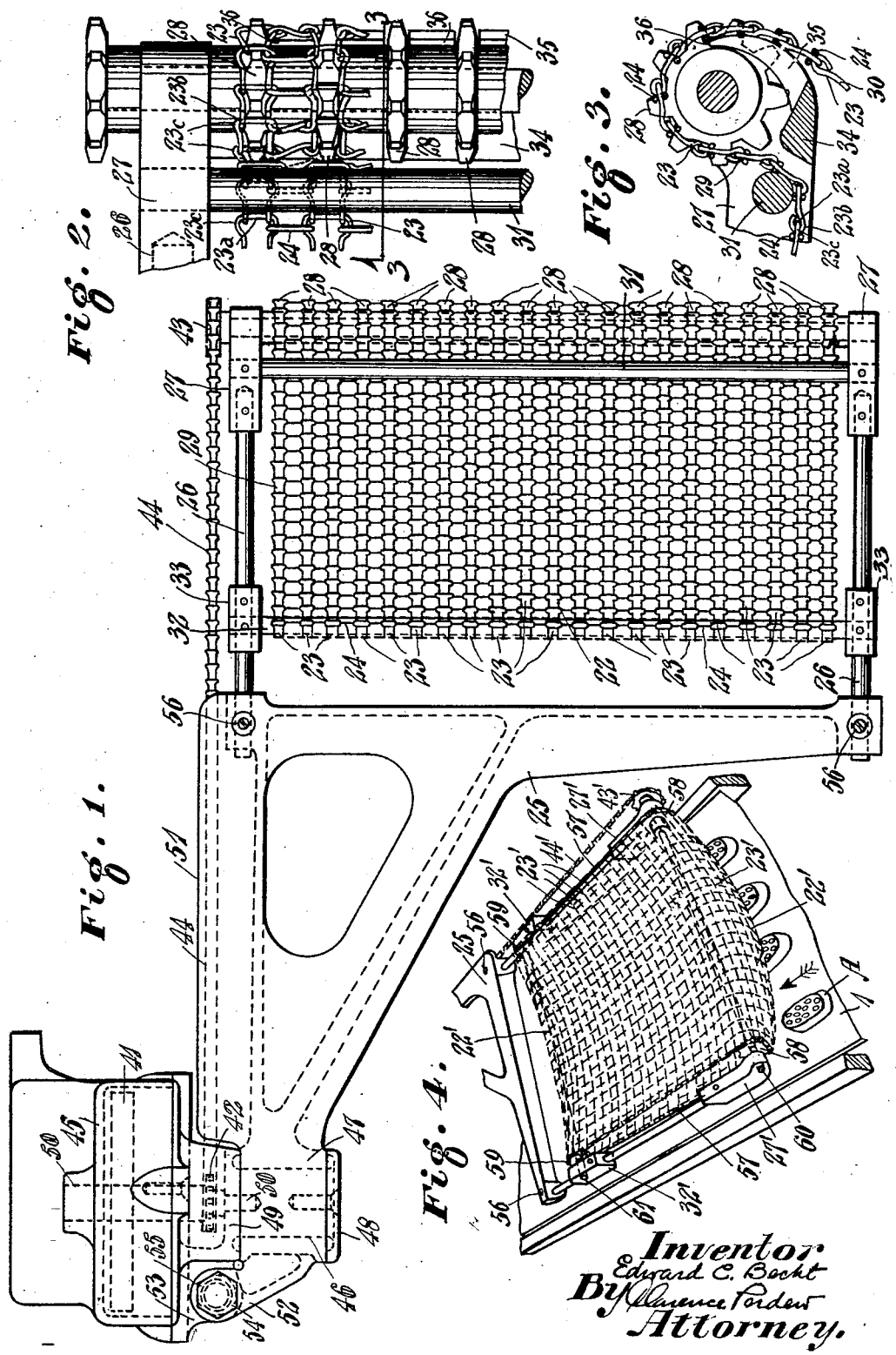

April 21, 1931. E. C. BECHT 1,801,992
APPARATUS FOR MAKING CONFECTIONS
Filed Feb. 16, 1926 2 Sheets-Sheet 2
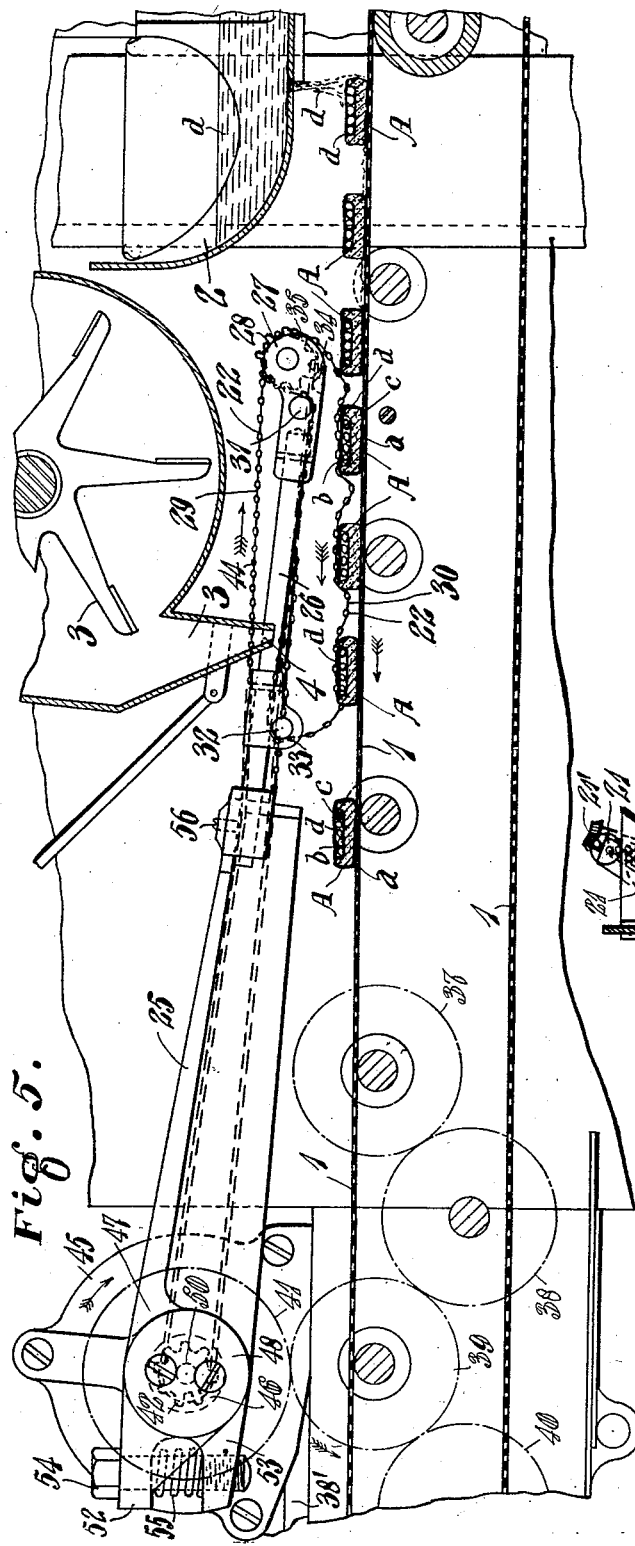
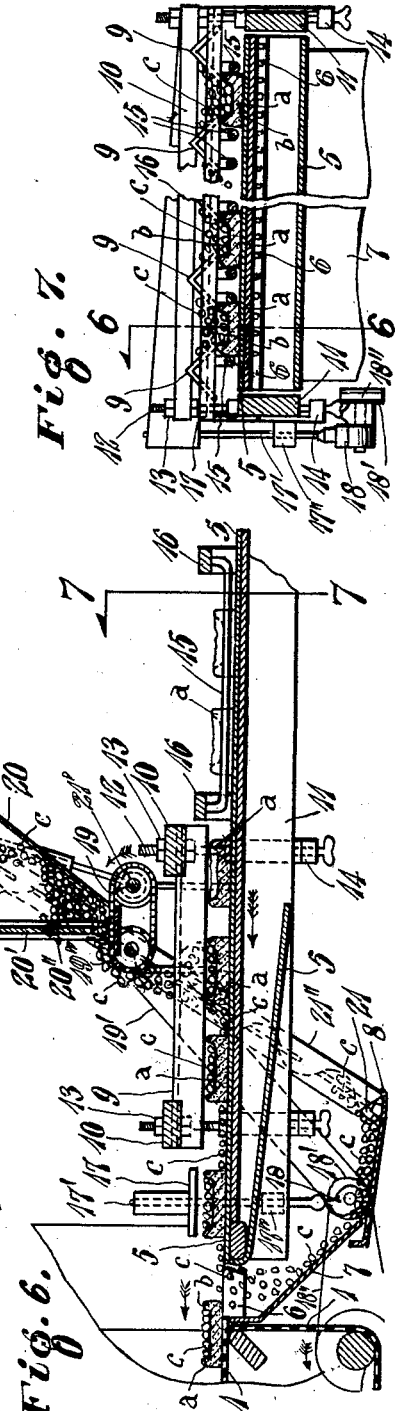
Inventor
Edward C. Becht
By Clarence Pardew
Attorney.

Patented Apr. 21, 1931

1,801,992

UNITED STATES PATENT OFFICE

EDWARD C. BECHT, OF NEWPORT, KENTUCKY

APPARATUS FOR MAKING CONFECTIONS

Application filed February 16, 1926. Serial No. 88,617.

My invention relates to confection making, and more especially to the making of confections such as that disclosed and claimed in my copending application, Serial No. 552,897, filed April 15, 1922; and its object is to facilitate the manufacture of such confections, which comprise filling material in a cavity in the confection center, held therein by the coating, as nearly as possible entirely by machinery, thereby permitting such confections to be produced on a commercial scale at a reasonable cost. The object of the apparatus especially is to facilitate the placing of the filling material in the cavity, and to hold it therein after the coating is applied, while the confection is subjected to a blast of air to remove the excess coating, as is done with a variety of confectionery-coating machines now in use. Other objects will appear in the course of the ensuing description.

I attain these objects by the apparatus illustrated, for example, in the accompanying drawings, in which—

Figure 1 is a plan view of the retaining mechanism and part of the driving means therefor;

Fig. 2 is a partial plan view, enlarged, better illustrating the web actuating means of the retaining mechanism shown in Fig. 1;

Fig. 3 is a partial longitudinal section of the same on the vertical plane of the line 3—3 of Fig. 2;

Fig. 4 is a perspective view, showing part of the coating machine and a retaining mechanism applied thereto which is a modification of that shown in Figs. 1, 2 and 3;

Fig. 5 is a partial vertical longitudinal section of a coating machine with my retaining mechanism of Figs. 1, 2 and 3 applied thereto, this mechanism being shown in side elevation;

Fig. 6 is a further partial vertical longitudinal section of the coating machine, including part of the feed belt thereof, with my filling material feeding apparatus applied thereto, this apparatus also being in vertical longitudinal section, on the plane of the line 6—6 of Fig. 7; and Fig. 7 is a partial vertical cross-section of the apparatus shown in Fig. 6, on the plane of the line 7—7 of Fig. 6.

The confection A, like that disclosed and claimed in my copending application above mentioned, comprises the center $a$ with a flat bottom and having in its top the upwardly opening cavity or crater $b$, in which is contained a quantity of edible material $c$. For instance, the center $a$ may be of a suitable composition of sugar and other ingredients well known in the art, and the filling material $c$ may be peanut kernels or other nut kernels, either whole or broken, or any other solid particles of edible material adapted to be filled into the depression or cavity $b$. This entire combination of center $a$ and material $c$ held in the crater or cavity $b$ thereof is coated with a suitable edible coating material $d$; for example chocolate, or other opaque coating such as icing, or a translucent coating, such as glacé coating material, all of which is more fully explained in my copending application before alluded to. Also, said application discloses, in a general way, my process and apparatus for carrying out the process, upon which my present invention may be said to be an improvement.

In Fig. 5 is illustrated the intermediate interior parts of a coating machine widely used in the art, known as the Enrober, having the permeable web conveyor belt 1, the fountain 2 at the right, discharging fluid coating material onto this belt 1, and the blower 3 just to the left of the fountain 2, which subjects the confections A to a blast of air from its nozzle 4 after these confections have received coating from the fountain 2 and have been carried to the left, under the blower, by the belt or web 1. In Fig. 6 is shown the right hand end part of such a coating machine, with the feed belt 5 passing the confections A to the permeable web or belt 1. Usually, this feed belt 5 passes very close to the belt 1, but in accordance with my invention I interpose a grating 6 between the two belts, with a chute 7 below it, discharging into a suitable receptacle 8 below the belt 5. This also is shown in my copending application just mentioned. However, in that application I disclosed only indiscriminate feeding of the filling material c, directly from the hand of the operator.

In my present invention, as shown in Figs. 6 and 7, a series of bars 9 are held in spaced relation, longitudinally of and some distance above the feed belt 5, by cross bars 10 which are supported from the side frame bars 11 of the machine by studs 12 which hold these cross bars by means of nuts 13 permitting the bar structure to be adjusted up and down. Also, the studs 12 are held to the side frame bars 11 by clamps 14, so that the entire structure may be adjusted longitudinally of the feed belt 5. The longitudinal bars 9 are angle bars, that is, of L-shaped cross-section, with their outer corners upward, so that the two legs of the angle form downwardly sloping chutes, those of two adjacent bars 9 converging toward the space between the bars. Guide rods 15 extend longitudinally of the feed belt 5 at the right of the bar structure just described, being supported on a cross-bar 16 having its ends supported on the side frame bars 11. These guide rods 15 are so arranged that each space between the bars 9 has the confections A guided thereunder by the rods 15, with the craters or cavities b of the confections close up to the lower edges of the inclined sides of the bars 9. Filling material c thrown onto the bars 9 flows through the spaces between these bars 9, most of it entering the cavities or craters b of the confections A as indicated. Those particles which fall onto the belt 5 between the ends of the confection A fall down through the grating 6 to the chute 7, going thence to the receptacle 8, from which they may be taken and reapplied to the bars 9, while the confections, longer than the space, pass over to the web or belt 1.

Just after the confections pass from under the left ends of the bars 9 a tamping device 17 acts to compact and level the particles in the cavities b; comprising a flat plate extending across and above the path of the confections and having one end fixed to the upper end of an upright rod 17' reciprocated up and down in a guide 17" on the frame bar 11 by a cam 18 having a pulley 18' by which it is rotated through the medium of a belt 18" from one of the rotating parts of the coating machine.

To feed the particles c to the bars 9, an endless chain belt 19 travels longitudinally over the bars 9, under a hopper 20 which has a front opening discharging the particles forwardly to the belt 19. This opening is varied in size, to regulate the volume of feed, by a shutter 20' held in up and down adjusted position by clamp screws 20" in the sides of the hopper. The belt 19 is driven by a belt 19' around the pulley 19" on the shaft with the wheels that carry the belt 19; this driving belt 19' leading from the pulley 18' of the tamping device 17. To return the particles from the lower receptacle 8 up to the hopper 20, a helical elevating conveyor 21 is provided at one side, also driven by the shaft that drives the belt 19, by means of bevel gears 21'; this conveyor working in a tube 21".

The confection A with its cavity compactly and evenly filled with the particles c, such as peanut kernels, now passes, on the permeable web 1, further to the left under the fountain 2, receiving a coating, such as chocolate, on its bottom, sides and top, as is well known in the art. This coating, as pointed out in my prior application mentioned, surrounds the particles c and binds them in the cavity b, but does not permeate between these particles. It will be understood, as is common with coating machines, that the blower 3 may be made to afford a stronger or weaker blast; the less expensive the product, the greater the force of the blast and the thinner the coating left on the goods. This usually requires a blast so strong that the particles c would be blown out of the crater b, held only by the yet soft surrounding coating. To permit the use of an ample blast of air on my improved confection, I provide the additional process step of blanketing the top of the confection with a slack, flexible, foraminous web 22, admitting the air blast to the confections but holding the particles c so as not to be displaced by the blast.

In the example of Figs. 1, 2, 3 and 5 the web 22 is made up of parallel ladder sprocket chains 23 running in direction of confection travel. Such ladder chains are made up of links each comprising a cross element 23a (Fig. 2) and two longitudinal terminal eyes 23b joining the respective cross elements 23a in outward curvatures 23c, each cross element 22a being embraced by the eyes 22b of the next link, out in these curvatures 22c, out of the way of the sprocket wheel teeth, as is well known in the art of ladder chains. I connect the chains 23 by the cross links 24, each, as shown, of S-shape, with its eyes embracing the adjacent outward curvatures 23c of the respective chain links 23. This chain web 22 is made endless.

The yoke 25 supports bars 26 at the sides of the path of the confections, on which bars are blocks 27 forming bearings for the shaft of a gang of sprocket wheels 28, each meshing with a respective chain 23 of the web 22, which passes around these wheels from its upper stretch 29 to its lower stretch 30. The upper stretch 29 passes up under a tension bar 31 to the wheels; and the lower stretch 30 passes up unto the upper stretch 29 at the left, around the supporting bar 32 fixed in blocks 33 on the side bars 26. The tension bar 31 likewise is supported in the right end bearing blocks 27. These bars 31 and 32 are spaced at such distance that the web 22 is left slack, and the friction at the bars 31 and 32 causes the upper stretch 29 to run rather tight; but causes the lower stretch 30 to run very slack. Being articulated and flexible in all directions, this lower stretch 30 sags down over the sides of the confections A, with a blanketing effect.

Owing to the looseness of this lower stretch 30, a stripping device is provided, comprising a transverse bar 34 lying under the gang of sprocket wheels, with prongs 35 projecting up to the right, with surfaces against the inner sides of the links of the chains 23 of the web 22 inclining from sharp edges 36 at the ends of the prongs radially inward from the pitch circles of the sprocket wheels, outward past the tops of the sprocket wheel teeth as the bases of the prongs are approached. Thus, the loose web is prevented from wrapping around the sprocket wheels, as it would were its chain links not stripped from the wheel teeth as they pass to the right and downwardly.

So that the web 22 will not drag the filling particles $c$ from the cavities $b$ of the confections, it is necessary to have the speed of travel of the web 22 very closely approximate that of the confectionery-coating machine web 1. The type of machine illustrated is very well known in the art, and without detailed illustration or description of the entire machine it is sufficient to explain that the train of gears 37, 38, 39 and 40, the pitch circles of which are indicated at the left end of Fig. 5, continues to the left with such arrangement that the coating machine web 1 is driven at the proper speed and in the proper direction; and that the gear 41, similarly indicated, which I introduce in mesh with the gear 39 of the above train, is of such ratio to the coating machine gears that, with a sprocket wheel 42 turning with this gear 41 and a sprocket wheel 43 fixed to the end of the gang of sprocket wheels 28, outside the frame, and a driving sprocket chain 44 passing around these wheels 42 and 43, the required uniformity of speed of travel of the web 22 and coating machine web 1 is insured.

It is desirable to have the web 22 pass down as closely to the tops of the confections A as is practicable without these running against the bottom of the retaining mechanism, i. e., the lower surface of the stripper bar 34. Therefore, as confections of different heights are to be treated, I prefer to make the supporting frame for the web 22 adjustable up and down. Thus, the driving gear 41 of the mechanism is housed in a casing 45 supported at the side of the coating machine, preferably on the cover 38′ (Fig. 1) for the gears 38, 39 and 40; and the inner side of this casing 45 has a stud 46 projecting inward across the machine, while the yoke 25 has a hub 47 embracing this stud, being held against endwise removal therefrom by the cap 48 screwed on the end of the stud. At the junction of the stud 46 with the side of the casing 45 is a small housing 49, opening to the right, containing the sprocket wheel 42, before mentioned, fixed on the shaft 50 along with the driving gear 41, which shaft is journaled in the outer side of the casing 45, at one end, and in the adjacent end of the stud 46 at the other end, concentric with the pivoting of the yoke 25 on this stud 46. The driving chain 44 passes out of this small housing to the wheel 43; and the yoke 25 preferably has the flange 51 projecting over this chain, acting as a safety guard. The yoke hub 47 has an ear 52 projecting to the left from its top, over a lug 53 projecting to the left from the bottom of the small housing 49 of the casing 45. A screw 54 passes down through the ear 52 and is threaded into the slug 53, while a helical spring 55, surrounding the screw 54, is compressed between the ear and the lug, holding the ear up against the head of the screw. Thus, by screwing this screw downward the retaining mechanism, mounted on the opposite end of the yoke 25, is raised; and by screwing this screw 54 upward, the spring 55 acts to lower the mechanism, and to hold it sufficiently rigidly for operation. In this adjustment the tension on the driving chain 44 is maintained owing to the concentric relation of the yoke and driving gear shaft, just noted; and to stretch the driving chain 44 as much as may be required, in assembling the machine, the two studs 26 are slidable in the yoke 25, being held stationary by set screws 56.

In the modification of Fig. 4 the arrangement is the same as has just been described, except that the web 22′ is made up of a series of chains 23′ suspended at their ends on longitudinal endless chains 57, and sagging transversely from one endless chain to the other. The structure of the web otherwise will be understood to be like that of the previous example. The endless chains 57 are stretched tightly around respective pairs of sprocket wheels 58 and 59, on shafts 60 and 61 journaled in the blocks 27′ and 32′ corresponding to the blocks 27 and 32 of the previous example, on studs 26 in the frame yoke 25. The right hand shaft 60 has the driving sprocket wheel 43′ receiving the driving chain 44′, which, it will be understood, forms part of a driving mechanism like that of the above described example. This is a less complicated construction of the retaining mechanism, and operates fairly well; there being however a tendency for the upper stretch of web 22′ to lag back and then suddenly drop over the right hand shaft 60, increasing the speed of the web 22 over that of the coating machine web 1 slightly, at intervals. Also, the transverse sagging results in the web 22′ not resting as closely down on those confections A' near the sides of the web, as upon the others A near the center. These defects are not so significant in practice as to hinder the use of this modified device; and it will be understood that other modifications may occur in practice.

Therefore, while I have somewhat specifically disclosed certain examples of my invention, I do not wish to be understood as being limited to such precise disclosure, but having thus fully disclosed my invention, as required, what I claim as new and desire to secure by Letters Patent is:

1. In a device of the character described, in combination with a coating machine comprising a coating conveyor, a coating dropper and a blower, a feeding conveyor spaced from the coating conveyor, a grating between the conveyors, means to guide confections in rows on the feeding conveyor, means to drop pieces of material in rows coinciding substantially with the rows of confections, over said feeding conveyor, and foraminous means under said blower to cover the confections as they pass under said blower.

2. In a device of the character described, in combination with a coating machine having a coating conveyor and means for driving said conveyor, comprising a gear at one side of said conveyor, a yoke pivoted at said side and extending across said conveyor, whereby said yoke may be swung up or down, a foraminous endless web, rotary driving means on said yoke, supporting and driving said web, and transmission means from said gear to said rotary driving means, comprising rotary means in operative relation to said gear and concentric with the pivoting of said yoke.

3. In a device of the character described, a conveyor, a blower having an outlet toward said conveyor, a slack, flexible, foraminous web comprising endless sprocket chains, between said outlet and said conveyor, and sprocket wheels meshing with certain ones of said chains.

4. In a device of the character described, a conveyor, a blower having an outlet toward said conveyor, a flexible, foraminous web between said outlet and said conveyor, and means for driving said conveyor and said web at substantially the same speed and maintaining said web slack.

EDWARD C. BECHT.